United States Patent [19]

Andersson

[11] Patent Number: 4,550,432
[45] Date of Patent: Oct. 29, 1985

[54] IMAGE PROCESSOR USING A MOMENT GENERATOR

[75] Inventor: Russell L. Andersson, Lawrenceville, N.J.

[73] Assignee: AT&T Bell Laboratories, Murray Hill, N.J.

[21] Appl. No.: 484,543

[22] Filed: Apr. 13, 1983

[51] Int. Cl.$^4$ .............................................. G06K 9/52
[52] U.S. Cl. .......................................... 382/1; 358/93; 358/107; 358/139; 364/513; 382/27; 382/41
[58] Field of Search ...................... 382/41, 27, 54, 48, 382/1; 358/107, 106, 160, 282, 284, 93, 101, 139; 364/724, 725, 554, 786, 463, 513; 356/375, 387

[56] References Cited

U.S. PATENT DOCUMENTS

| | | | |
|---|---|---|---|
| 4,110,832 | 8/1978 | Leininger et al. | 364/786 |
| 4,159,522 | 6/1979 | Zanoni | 356/387 |
| 4,435,837 | 3/1984 | Abernathy | 356/375 |
| 4,443,855 | 4/1984 | Bishop et al. | 364/513 |
| 4,499,597 | 2/1985 | Alves | 382/41 |

OTHER PUBLICATIONS

Finney, "Carry Propagate for Carry Save Adder", *IBM Tech. Dis. Bulletin*, vol. 25, No. 8, Jan. 1983, pp. 4282–4284.

Gleason et al., "Modular Vision System for Sensor-Controlled Manipulation and Inspection", *9th Int. Symposium on Ind. Robots*, Wash. D.C., 3–1979, pp. 57–70.

Vuylsteke et al., "Video Rate Rec. of Plane Objects", *Sensor Review International Quarterly*, 7-1981, pp. 132–135.

*Primary Examiner*—Leo H. Boudreau
*Attorney, Agent, or Firm*—Richard J. Roddy; Henry T. Brendzel

[57] ABSTRACT

In a robotics system, an image processor may use a moment generator in the identification of an object. Image signals may be provided by an image source such as a TV camera. Synchronizing signals may be extracted from the image signals and together with the image may be used to modify the image signals. Either modified or unmodified image signals may thereafter be processed. Further, the synchronization signals together with moment select signals may be supplied to a moment generator logic array which, in turn, is arranged to provide iterative control signals responsive to which the moment generator may iteratively and recursively generate moments in an orderly, time efficient manner. For example, in one embodiment, p-values ($p = x^i y^j$) may be iteratively and recursively generated (using stuffing) and combined (using a logic AND) with the image signals $\bar{a}(x,y)$ being processed to further generate $$F_k \left( = \sum_{x,y} a_k p \right)$$

values, which $F_k$-values may be combined (using shifting and addition) to generate a specific moment $$M_{i,j} \left( = \sum_{x,y} a(x,y) x^i y^j \right),$$

which moment to be generated is identified responsive to the moment select signals. Further, the moment generator is adapted to concurrently generate the moments for each of a plurality of regions of the TV picture.

14 Claims, 9 Drawing Figures

FIG. 3

| $P'_{i,j}$ | NEXT FS $x=0$ $y=0$ | NEXT HS $(x=0$ $y \rightarrow y+1)$ | NEXT PC $x \rightarrow x+1$ |
|---|---|---|---|
| $P'_{0,0} =$ | 1 | 1 | 1 |
| $P'_{1,0} =$ | $P_{1,0} = 0$ | $P_{1,0} = 0$ | $P_{1,0} + 1$ |
| $P'_{2,0} =$ | $P_{2,0} = 0$ | $P_{2,0} = 0$ | $P_{2,0} + 2x + 1$ |
| $P'_{0,1} =$ | $P_{0,1} = 0$ | $P_{0,1} + 1$ | $P_{0,1}$ |
| $P'_{1,1} =$ | $P_{1,1} = 0$ | $P_{1,1} = 0$ | $P_{1,1} + y$ |
| $P'_{0,2} =$ | $P_{0,2} = 0$ | $P_{0,2} + 2y + 1$ | $P_{0,2}$ |

FIG. 5

```
pla (fs,hs,msel2,msel1,msel0,_clrc,mxs2,mxs1,ctcin,
     pacin,_mxs0,_clrp,_kill)
  int fs,hs,msel2,msel1,msel0;
  int *_clrc,*mxs2,*mxs1,*ctcin,*pacin,*_mxs0,*_clrp,*_kill;
{
  int mt0, mt1, mt2, mt3, mt4, mt5, mt6, mt7, mt8, mt9,
      mt10, mt11;

mt0=!fs&!hs&!msel2&msel1&msel0;
  mt1=!fs&!hs&msel2;
  mt2=!fs&hs&!msel2&msel1&msel0;
  mt3=!fs&hs&msel2&!msel1&msel0;
  mt4=!fs&hs&msel2&msel1;
  mt5=fs&hs;
  mt6=!fs&!hs&msel2&!msel1&!msel0;
  mt7=!fs&!hs&!msel2&!msel1&msel0;
  mt8=!fs&hs&!msel2&msel1&!msel0;
  mt9=fs&!hs&!msel2&!msel1&!msel0;
  mt10=!fs&!hs;
  mt11=!fs&hs&!msel2&!msel0;
  *_clrc=mt0|mt1|mt2|mt3|mt4|mt5;
  *mxs2=mt6|mt3;
  *mxs1=mt0;
  *ctcin=mt6|mt2|mt3;
  *pacin=mt7|mt6|mt8|mt3|mt9;
  *_mxs0=mt0|mt6|mt3;
  *_clrp=mt10|mt11|mt3|mt4|mt5;
  *_kill=mt10;
}
```

IMAGE PROCESSOR USING A MOMENT GENERATOR

FIELD OF THE INVENTION

This invention relates to an image processing system and, more particularly, to an image processor using a moment generator.

BACKGROUND OF THE INVENTION

In the art of robotics, it is becoming increasingly concluded that the robot should "see" an object and, in response thereto, be able to perform some predetermined (and perhaps adaptive) task. The robot may "see" the object by use of a television camera, which provides electrical signals representing the object to an image processor controller arrangement. One known vision arrangement is disclosed in the publication by G. J. Gleason et al, "A Modular Vision System for Sensor-Controlled Manipulation and Inspection," *9th International Symposium on Industrial Robots* (Mar. 13–15, 1979), pp. 57–70. There a camera provides an object picture having a 128×128 array of picture elements (also called pixels or pels in the art). The TV camera pel signals are coupled through an interface preprocessor to a digital computer. The computer includes memory for storing vision library programs as well as application programs. The programs are designed to analyze the object picture by segmenting the picture into contiguous regions of one color (such as black or white), which regions are called "blobs". Associated with each blob is an array of data, called a blob descriptor. Each blob descriptor includes information which characterizes features of the blob, such as its geometrical area, which features, in turn, are useful for identifying the specific object "seen" by the TV camera.

One set of features is related to the algebraic moments of the area of a blob. Moments are mathematically useful for determining the geometrical center of the blob and are commonly of a form such as $\Sigma x$, $\Sigma y$, $\Sigma x^2$, and $\Sigma xy$, and $\Sigma y^2$ or even higher powers where the symbol $\Sigma$ means summation. Unfortunately known moment generators typically suffer from time inefficiencies related to multiplicative operations.

SUMMARY OF THE INVENTION

This and other problems are mitigated in accordance with the principles of my invention by an image processor, system and method including a moment generator usable in the indication of an object. Image signals may be provided by an image source such as a TV camera. Synchronizing signals may be extracted from the image signals and together with the image signals may be used to modify the image signals. Either modified or unmodified image signals may thereafter be processed. Further, the synchronization signals together with moment select signals may be supplied to the moment generator which, in turn, is arranged to provide iterative control signals responsive to which the moment generator may iteratively and recursively generate moments in an orderly, time efficient manner. For example, p-values may be generated and combined with the image signals $a(x,y)$ being processed to further generate $F_k$ values which $F_k$-values may be combined to generate a specific moment $M_{i,j}$, which moment being generated is identified responsive to the moment select signals. Further, the moment generator may concurrently generate a moment for each of a plurality of regions of a picture represented by the image signals.

BRIEF DESCRIPTION OF THE DRAWING

My invention should become more apparent from the following detailed description when taken in conjunction with the accompanying drawings in which:

FIG. 3 illustrates in tabular form a next p-value p' as the next p-value iteratively relates to the present p-value p. The iternative process may be embodied in a p-value generator such as is illustrated in FIG. 6 for inclusion in a moment generator such as illustrated in FIG. 4;

FIG. 5 illustrates a series of steps which steps are written using the C-programming language and which steps may be included in the programmed logic array (PLA) 500 shown in FIG. 4;

DETAILED DESCRIPTION

Figure 1:
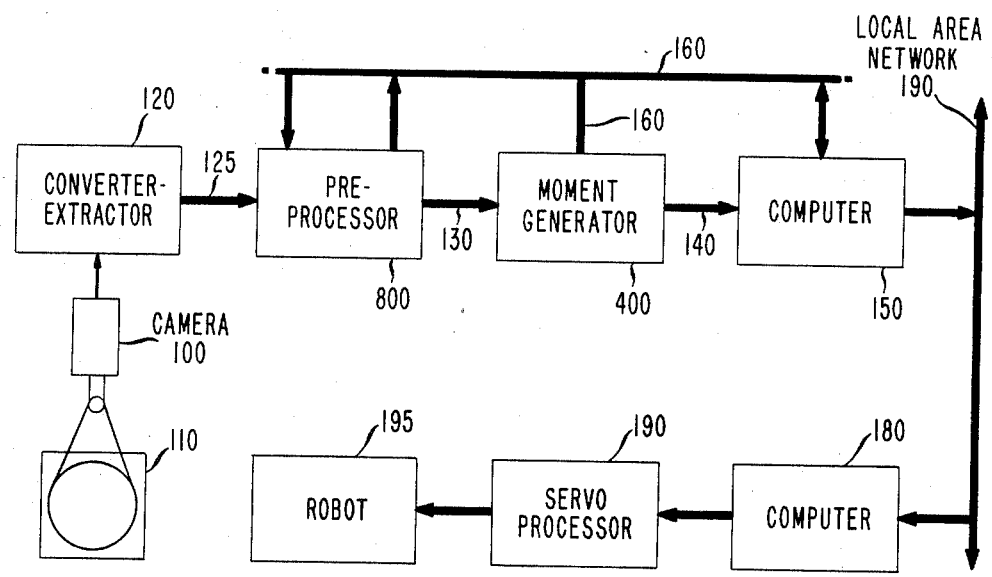
FIG. 1 depicts one form of image processing system which may include an image processor using a moment generator useful to illustrate the principles of my invention.

Referring to FIG. 1, one illustrative form of image processing system may include a television camera 100 for seeing an object 110 and for providing electrical pel signals representing the object. The analog television signals may be extended from TV camera 100 to analog-to-digital converter and synchronization extractor 120, which not only converts the analog television signal to a digital television signal but also extracts synchronization signals from the television signal and extends the resultant signals over cable 125 to preprocessor 800. The TV signals are coupled through preprocessor 800 and thence over cables 130 and 160 through one or more moment generators 400 and over cable 140 to a first digital computer 150. An output of computer 150 may be coupled over a cable 190 (or alternatively, for example, through a local area network) either directly or through a second digital computer 180 to a servo-processor 190 for controlling a robot 195.

As priorly mentioned, one problem with known image processors relates to the inefficiency of a therein included moment generator. Generically, moment $M_{i,j}$ may be expressed as $$M_{i,j} = \sum_{(x,y)} a(x,y) x^i y^j \text{ where } i \geq 0, j \geq 0 \qquad (1)$$

and where $a(x,y)$ is a weighting function, e.g., for measuring some feature(s) of the TV signal such as the multilevel intensity of the incoming TV signal, the color of the TV signal, etc. A study of equation (1)

reveals the apparent need for two exponentiations (i.e. $x^i$ and $y^j$), two multiplications (e.g., a(x,y) times $x^i$ times $y^j$) and one addition for each pel in the TV picture. Therein lies the gravamen of a problem. To comprehend some reasonable time constraints, consider a TV picture including 256 pels per line, $262\frac{1}{2}$ lines per frame and 60 frames per second. The moment generator would then process about 4,032,000 pels per second, or equivalently about 248 nanoseconds per pel. Further factors such as avoiding the buffering of an image signal suggest that it may be more desirable to process pels within a time constraint of about 160 nanoseconds per pel.

It is toward processing pels at such a high rate that the principles of my invention are directed.

For purposes of brevity and not by way of limitation, some assumptions are made to aid in describing the principles of my invention. For example, assume integer arithmetic. Also, assume an internal clock provides a clocking signal having a period equivalent to 160 nanoseconds per pel. With the foregoing and with some subsequently stated assumptions, equation (1) can be rewritten as the dot product of two vectors $\bar{a}$ and $\bar{p}_{i,j}(x,y)$ where $\bar{a} = [a(0,0)\ a(1,0)\ a(2,0) \ldots a(0,1)\ a(1,1)\ a(2,1) \ldots a(M,N)]$ and $p_{i,j}(x,y) = [x_0^i y_0^j\ x_1^i y_0^j\ x_2^i y_0^j \ldots x_0^i y_1^j\ x_1^i y_1^j\ x_2^i y_1^j \ldots x_M^i y_N^j]$, where a(0,0), for example, stands for $a(x_0, y_0)$, x is the column number of a pel, y is the row number of a pel, the subscript M is the last pel is each row and the subscript N is the last row. In shorthand notation, the moment M can be written as:

$$M_{i,j} = \bar{a} \cdot \bar{p}_{i,j} \quad (2)$$

In turn, an element of weight vector $\bar{a}$ at point x,y, i.e., a(x,y), can be expressed in a binary form as:

$$a(x,y) = \sum_{k=0}^{n} 2^k \bar{a}_k \quad (3)$$

As an aside, it is generally assumed that n=7 so that the image processor generally uses eight-bit bytes. Clearly, a greater or lesser number of bits could be used for adjusting the accuracy of the processor. Eight-bit bytes are here assumed only for purposes of illustration and not by way of limitation. Indeed, in describing an illustrative embodiment, e.g. in FIGS. 6, 7, 8, 9, a slash (/) with a number, e.g. 8, 9, is illustrative of the number of bits being extended over the respective cable. Continuing, because the dot product is a linear operation, equation (3) can be substituted in equation (2) to obtain $$M_{i,j} = \sum_{k=0}^{n} 2^k F_k, \quad (4)$$

where $$F_k = \sum_{(x,y)} \bar{a}_k \bar{p} \quad (5)$$

From the above it is apparent that each term $F_k$ is a function of i and j (since the p-values depend on i and j), but for sake of simplicity the symbol employed herein shall simply be $F_k$. As an aside and as will be made more clear hereinafter, equation (4) may be divided into subsets, where each subset represents a region r of the TV picture. When such subdivision is made the moments $M_{i,j}^{(r)}$ for each region r (=0,1,2, ... ,t) where $t \leq n$ may be concurrently generated. For example, assuming a subdivision into two regions r=0 and 1, respective moments using equation (4) may be formed as $$M_{i,j}^{(0)} = \sum_{k=0}^{m} 2^k F_k \text{ and}$$

$$M_{i,j}^{(1)} = \sum_{k=m+1}^{n} 2^{k-(m+1)} F_k$$

Continuing, inasmuch as weight vector $\bar{a}$ is expressed in binary form, it is clear that $a_k$ is either a zero or a one. Therefore the multiplication in equation (5) reduces to a logical AND! Fortuitously therefore, some inefficiency related to the multiplications is removed in the moment generator of my image processor. In addition, the multiplication of the $F_k$-value is equation (4) reduces to an iterative logical binary shifting! Thus my image processor improves over the time efficiency of known image processors.

A remaining problem to be solved is the generation of the $p_{i,j}$ values which in turn are to be multiplied (here logically ANDed) with the binary weights $a_k$ in equation (5). Toward that end, assume (i+j) does not exceed two. As an aside, it is common in the art to refer to the sum i+j as the $(i+j)^{th}$ order moment. Here therefore my description is to at most second order moments. This assumption is not by way of limitation. The skilled art worker upon understanding the principles of my invention will readily comprehend how those principles also extend to lesser or greater than second order moments. My assumptions are made only to aid in a description of the principles of my invention and to assist in the brevity of that description. Continuing, the following table then identifies the possible $p_{i,j}$-values, when $i+j \leq 2$ and $i \geq 0$, $j \geq 0$:

| i = | j = | 0 | 1 | 2 |
|---|---|---|---|---|
| 0 | | 1 | y | $y^2$ |
| 1 | | x | xy | — |
| 2 | | $x^2$ | — | — |

Figure 2:
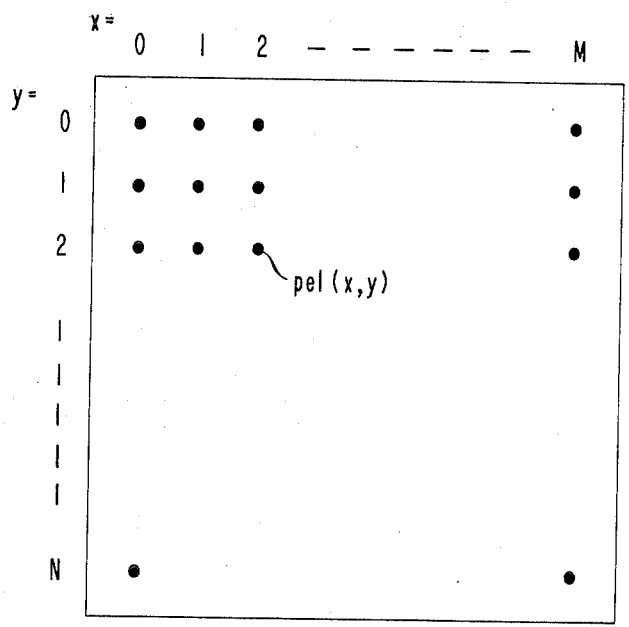
FIG. 2 illustrates a typical M×N television picture element array.

By way of an introduction to the description of an element of moment generator 400 in my illustrative image processor, i.e., p-value generator 600 for generating the p-values, consider the typical television scene illustrated in FIG. 2. An (M+1×N+1) array of pels is shown. For purposes of notation, consider the TV scene as being scanned line-by-line in a generally left-to-right direction beginning in the upper left corner (i.e., x=0, y=0) proceeding left to right across the first line (i.e., x→x+1, y=0) to the pel in the upper right corner (i.e., x=M, y=0) thence to the second line (i.e. x=0, y=1) and again left-to-right, etc.

Further, using words and phrases common in the art, a new "field" is scanned beginning in the upper left corner upon receipt of a field synchronization (FS) signal. That is, in response to an FS signal, scanning begins with the pel located at coordinates (x=0, y=0). Further in response to a horizontal synchronization (HS) signal scanning of a new line begins (e.g., scanning begins with the pel located at the start of the next line, i.e., at a y value after y is incremented by one). In my illustrative embodiment, each HS signal functions in a manner analogous to a carriage return on a standard typewriter. Here x is set to zero and y becomes y+1 and the $(y+1)^{th}$ line is scanned. Further in response to a pel clock (PC) synchronization signal, scanning of a new pel begins (e.g. scanning begins with the next pel located on the same line, (or same y) and thereafter x is incremented by one). The FS, HS and PC signals may be extracted from the TV camera signal by converter-extractor 120 and therefrom extended through preprocessor 800 to moment generator 400 in my illustrative processing system. In the alternative, an internal clock may be employed to provide a clock signal equivalent to 160 nanoseconds per pel and that clock signal may be used in lieu of the PC signal. Further, and as hereinafter described, combinations of the FS and HS signals together with the 160 nanosecond clock signal may be employed to provide an even more time efficient image processing system. Accordingly, reference hereinafter to a PC signal is assumed for purposes of illustration to correspond to reference to the 160 nanosecond clock signal.

With the foregoing background, some observations are in order. Firstly, the usual scanning of pels begins with the pel situated at coordinates (x=0, y=0) in response to an FS signal and proceeds left-to-right on the first row of pels (i.e., y=0) and, in response to consecutive PC signals, x is consecutively incremented. Eventually, the last pel on the first line is scanned (i.e., x=M) and, in response to an HS signal, scanning continues with the pel situated at coordinate (x=0, y=1), i.e. with the first pel in the second line and again left to right on the second line of pels, et cetera until the pel situated at coordinates (x=M, y=N) is scanned after which an FS signal restarts the scanning.

In light of the left-to-right, top-to-bottom scanning the $\bar{p}$-value generator 600 may serially generate a p-signal with values appearing in the same order e.g., in the following order:

$$
\left.\begin{array}{l}
p_{i,j}(0,0); \ p_{i,j}(1,0); \ \ldots p_{i,j}(M,0); \\
p_{i,j}(0,1); \ p_{i,j}(1,1); \ \ldots p_{i,j}(M,1); \\
\quad \cdot \\
\quad \cdot \\
\quad \cdot \\
p_{i,j}(0,N); \ p_{i,j}(1,N); \ \ldots p_{i,j}(M,N)
\end{array}\right\} \quad (6)
$$

where here the notation $p_{i,j}(x,y)$ is used in place of $p_{i,j}$ to emphasize the plurality of p-values involved. In addition thereto, each $p_{i,j}(x+1,y)$ value may be recursively generated using its preceding value $p_{i,j}(x,y)$ as the scan moves left-to-right across a line, i.e., as x is incremented in response to a PC signal. The table shown in FIG. 3, summarizes the foregoing iterative process. For example, consider the p-value $p_{2,0}(x+1,y)$ at pel coordinates (x+1,y), which p-value can be written in the following way:

$$p_{2,0}(x+1,y) = (x+1)^2 y^0 = x^2 + 2x + 1 \quad (7)$$

However, inasmuch as $p_{2,0}(x,y) = x^2$, the above equation (7) can be rewritten as:

$$p_{2,0}(x+1,y) = p_{2,0}(x,y) + 2x + 1 \quad (8)$$

or equivalently letting the present p-value $p_{2,0}(x,y) = p_{2,0}$ and the next p value $p_{2,0}(x+1,y) = p'_{2,0}$ equation (8) becomes:

$$p'_{2,0} = p_{2,0} + 2x + 1. \quad (9)$$

Here, we note that as the scan passes left-to-right, the x coordinate is incremented by one to x+1 for the subsequent pel (i.e. $x \rightarrow x+1$ in response to each PC signal). Of course as the scan moves across a line the y coordinate does not change. At the end of a line, the scan begins at the first pel in the next line. Therefore the x coordinate may be set to zero while the y coordinate may be incremented by one from y to y+1 (i.e. $y \rightarrow y+1$ in response to each HS signal). In similar fashion, the (x,y) coordinates may be set to (0,0) in response to each FS signal. As a result of the foregoing, FIG. 3 illustrates the next p-value i.e. p' for the assumed scanning pattern of my illustrative image processor. Clearly, in light of the above, a table similar to that illustrated in FIG. 3 could be developed in accord with the principles of my invention for an alternative scanning pattern arrangement.

Now referring to FIG. 3, an embodiment thereof, e.g. p-value generator 600, leads to solving some prior art inefficiencies. Noting the above equations, it becomes clear that the inefficient exponentiation and multiplication functions can be replaced by the more efficient shifting, stuffing and adding functions. For example, using binary arithmetic, 2x+1 can be readily obtained by a single left shift of the contents of an x-register to provide the quantity 2x and then a stuffing of a "1" in the low order bit of the x-register to provide the quantity 2x+1. As is hereinafter described, my illustrative embodiment avoids the stuffing function through the use of a carry function.

Fortuitously my image processor mitigates the inefficiencies related to operations such as exponentiation and multiplication by replacing those operations with more efficient operations such as iterative addition, shifting and stuffing. Further experimentation has lighted and tunnel for even further improved performance. As the above mentioned operations occur, the intermediate iteratively recursive results would propagate through various registers, for example, through an accumulator or an adder. The propagation can introduce a delay. To further mitigate and cited inefficiencies, my image processor includes a "carry save adder" arrangement, which advantageously reduces propagation delay.

We now more particularly describe my illustrative image processor using moment generator 400 as it may interact in an image processing system including computer 150 and preprocessor 800.

Figure 8:
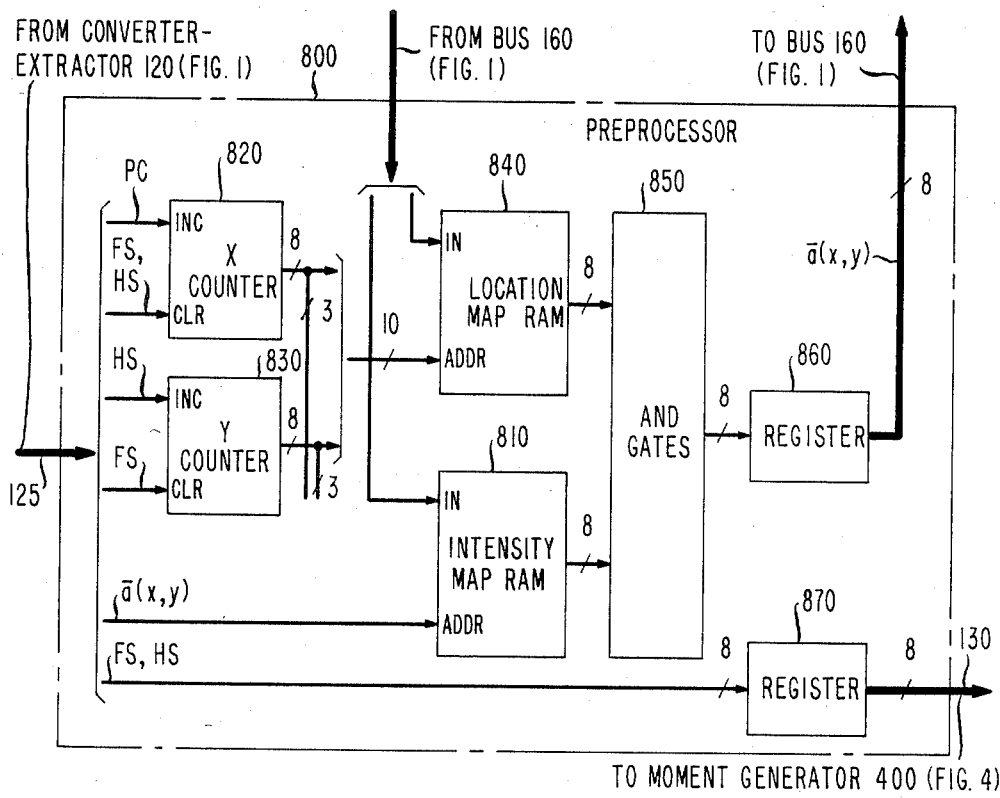
FIG. 8 illustrates a preprocessor 800 of a type which may be included in the image processing system of FIG. 1.

Firstly in my illustrative embodiment, converter/extractor 120 may extend a digital television signal, e.g. a multiple level signal such as $\bar{a}(x,y)$ for showing color variations other than just a bilevel black and white. Converter/extractor 120 may also extract the FS and HS synchronizing signals priorly described and extend those signals to preprocessor 800 and therein through register 870 over cable 130 to one or more moment generators 400. Register 870 is for equalizing the delay of the signals through preprocessor 800. Referring now to FIG. 8, we describe preprocessor 800. An x counter 820 may be incremented between values zero and M (here assume M=255). The x counter 820 may be cleared in response to an HS signal or in response to an FS signal. The x counter 820 may be incremented in response to a PC signal. In a parallel manner, y counter 830 may also be incremented between zero and N (here assume N=255). The y counter 830 may be cleared in response to an FS signal. The y counter 830 may be incremented in response to an HS signal. As x counter 820 and y counter 830 are respectively incremented or cleared, certain high order bits, of each counter, in my illustrative embodiment the five high order bits from each counter, are combined to form a multibit address, here a ten-bit address, input to location map random access memory (RAM) 840. Similarly, the weight signals from A/D converter and sync extractor 120, which weight signals can be the weight signals $\bar{a}(x,y)$ priorly mentioned, can be applied to an eight-bit address input of intensity map RAM 810. Location map 840 like intensity map 810 may be embodied by way of a standard random access memory. Intensity map 810 and location map 840 may either be preprogrammed or may be modified responsive to first computer 150 extending inputs over cable 160 to a respective data input of either of the two map RAMs. In any event, maps 810 and 840 permit, but do not require, adjustment or modification to the television weight signal $\bar{a}(x,y)$. The modified or unmodified weight signal may then be extended through AND gates 850 and register 860 over cable 160 to the respective moment generator 400. For example, location map 840 may be used to modify the television picture by isolating some predetermined area or region of the picture so as to place greater or less emphasis on one region of the television picture over another region of the television picture. One modification may contemplate, for example, that the weight vector may have $\bar{a}(x,y)$ weight values equal to zero for some regions of the picture and $\bar{a}(x,y)$ weight values equal to nonzero for other regions of the picture. Another modification may contemplate, for example, modification of the intensity values to account for nonlinearity effects stemming from the TV camera 100. Still another modification may contemplate, for example, intensity map 810 and/or location map 840 being preprogrammed or modified to identify two or more regions (e.g. up to n+1 regions) of a picture. The moments of each such region may be concurrently generated thereby even further improving the efficiency of my image processor by concurrently tracking a plurality of regions of the picture. Other modifications may occur to the skilled art worker. However for convenience, the present description uses the symbol $\bar{a}(x,y)$ to identify both the unmodified weight signal provided from converter/extractor 120 over cable 125 and the modified (or unmodified) weight signal provided from preprocessor 800 over cable 160 even though the two signals may not be identical.

Figure 4:
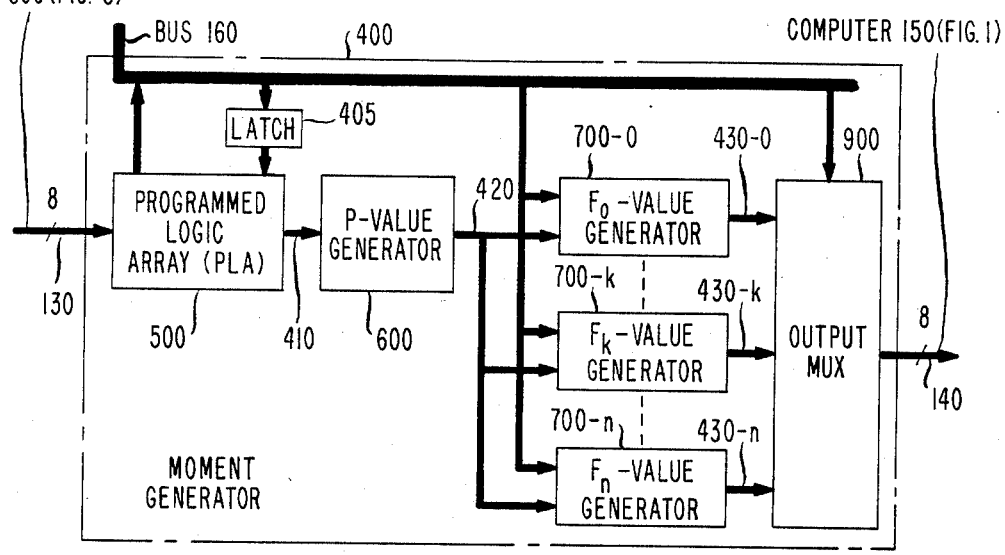
FIG. 4 illustrates a moment generator one or more of which may be included in the image processing system of FIG. 1.

Secondly, referring to FIG. 4, therein schematically illustrated is a moment generator 400 which is useful in illustrating some of the principles of my invention. While one moment generator 400 is shown, there may be a plurality of moment generators 400, coupled in parallel so as to generate in parallel the various moments $M_{i,j}$ (in my example there are six such moments). For ease of description, and not by way of limitation, one moment generator is shown and described. Inputs to each such moment generator 400 are extended over cables 130 and 160 from preprocessor 800 as well as over cable 160 from first computer 150. Specifically, the inputs include an HS signal and an FS signal each of which is extended from preprocessor 800 to moment generator 400 over cable 130 and therein to programmed logic array (PLA) 500. In addition under the control of first computer 150, moment select (msel) line signals for identifying the particular moment to be generated, i.e., the particular combination of i and j, are extended from first computer 150 over cable 160 to moment generator 400 and also therein through latch 405 to PLA 500. Inasmuch as there are six moments which meet the constraints of the above cited assumptions (e.g. $i+j \leq 2$; $i \geq 0$; $j \geq 0$) three binary bits may be used to identify which one of the particular six moments is to be generated. In my illustrative embodiment the three binary bits are moment select signals and are identified as mse12, mse11, and mes10. The moment select signals may be stored in latch 405, thereby further mitigating equipment costs. The following table summarizes one illustrative but definitive meaning of the mse12, mse11 and mse10 moment select signal bits:

| mse12 | mse11 | mse10 | moment to be generated |
|-------|-------|-------|------------------------|
| 0 | 0 | 0 | $M_{0,0}$ |
| 0 | 0 | 1 | $M_{1,0}$ |
| 0 | 1 | 0 | $M_{0,1}$ |
| 0 | 1 | 1 | $M_{1,1}$ |
| 1 | 0 | 0 | $M_{2,0}$ |
| 1 | 0 | 1 | $M_{0,2}$ |
| 1 | 1 | 0 | don't care |
| 1 | 1 | 1 | don't care |

From the foregoing, it should be clear to the skilled artworker that my image processor may include a plurality of moment generators 400. For example, as mentioned, one alternative contemplates generating one moment $M_{i,j}$ as identified by the respective moment select signals. Hence, the six moments could be generated sequentially. To further improve the time efficiencies of my image processor, another alternative contemplates generating all six moments in parallel. For brevity of description and not by limitation, the description here is as to a single moment generator 400. Also, in addition, the weighting function $\bar{a}(x,y)$ for measuring a feature(s) of the incoming RV signal is extended from preprocessor 800 over cable 160 to each moment generator 400 and therein to the respective $F_k$-signal generator 700-k which develops the $F_k$-values described earlier, beginning with Equation 4. Lastly, $F_k$-value identifying control signals, which identify the specific $F_k$-signal (see equation (4) above) to be extended from moment generator 400 to first computer 150, are extended from first computer 150 over cable 160 to each moment generator 400 and therein, as will hereinafter be described, to decoder 901 for enabling or disabling an output of the respective output multiplexer 900.

In general, and with the foregoing background, input signals to moment generator 400 are extended therein to programmed logic array (PLA) 500. PLA 500 operates in accord with the logic recited in the C-language program statements shown in FIG. 5. The program statements of FIG. 5 should be readily understandable to the ordinary art worker when reference is made to the publication by B. W. Kernighan and D. M. Ritchie "The C Programming Language" (Prentice Hall 1978). Specifically, the first statement illustrated in FIG. 5, i.e. the statement beginning "pla(fs, hs, . . . )", identifies input and output signals which are used in moment generator 400. The input arguments fs and hs are equivalent to the previously described FS and HS signals, respectively, which are provided from converter/extractor 120 through preprocessor 800. Specifically, the following table identifies the combinations of the fs and hs signals and a resultant function as also shown in FIG. 3:

| fs | hs | Logical Function |
|----|----|------------------|
| 0  | 0  | NEXT PC (i.e. x→x+1) |
| 0  | 1  | NEXT HS (i.e. x=0,y→y+1) |
| 1  | 0  | NEXT FS (i.e. x=0; y=0) |
| 1  | 1  | BLANK (i.e. no change in state occurs) |

The next three arguments of the first statement are the moment select input arguments mse12, mse11, and mse10, which as priorly described are for identifying the specific moment to be generated.

The remaining arguments of the first pla statement in FIG. 5 identify iterative control output signals from PLA 500. The manner in which my illustrative image processor responds to the iterative control signals is more particularly described with respect to the p-value generator 600 of FIG. 6 as well as the $F_k$-value generator 700-k of FIG. 7 and output multiplexer 900 of FIG. 9. For reference purposes however, the iterative control signal arguments are here summarized:

| pla Output Argument | Meaning |
|---------------------|---------|
| "_clrc"  | clear counter. |
| "mxs2"   | multiplexer select 2. |
| "mxs1"   | multiplexer select 1. |
| "ctcin"  | counter carry-in. |
| "pacin"  | p adder carry-in. |
| "_mxs0"  | multiplexer select 0. |
| "_clrp"  | clear p-value generator. |
| "_kill"  | kill $\bar{a}(x,y)$ values. |

Further, the underline, i.e., the _ preceding, for example, an argument such as _ clrc means that the clrc signal is active when it is low rather than when it is high where low means logic "0" and high means logic "1".

In light of the above, it is clear that the PLA 500 can be embodied either in hardware or in software. It appears least costly to embody PLA 500 in a hardware structure in accord with the logic recited in the statements of FIG. 5. Whichever embodiment is used, responsive to signals supplied from preprocessor 800 and from first computer 150, output iterative control signals are extended from PLA 500 over cable 410 to a p-value generator 600 for use therein as well as therethrough to $F_k$-value generator 700-k for use therein.

Figure 6:
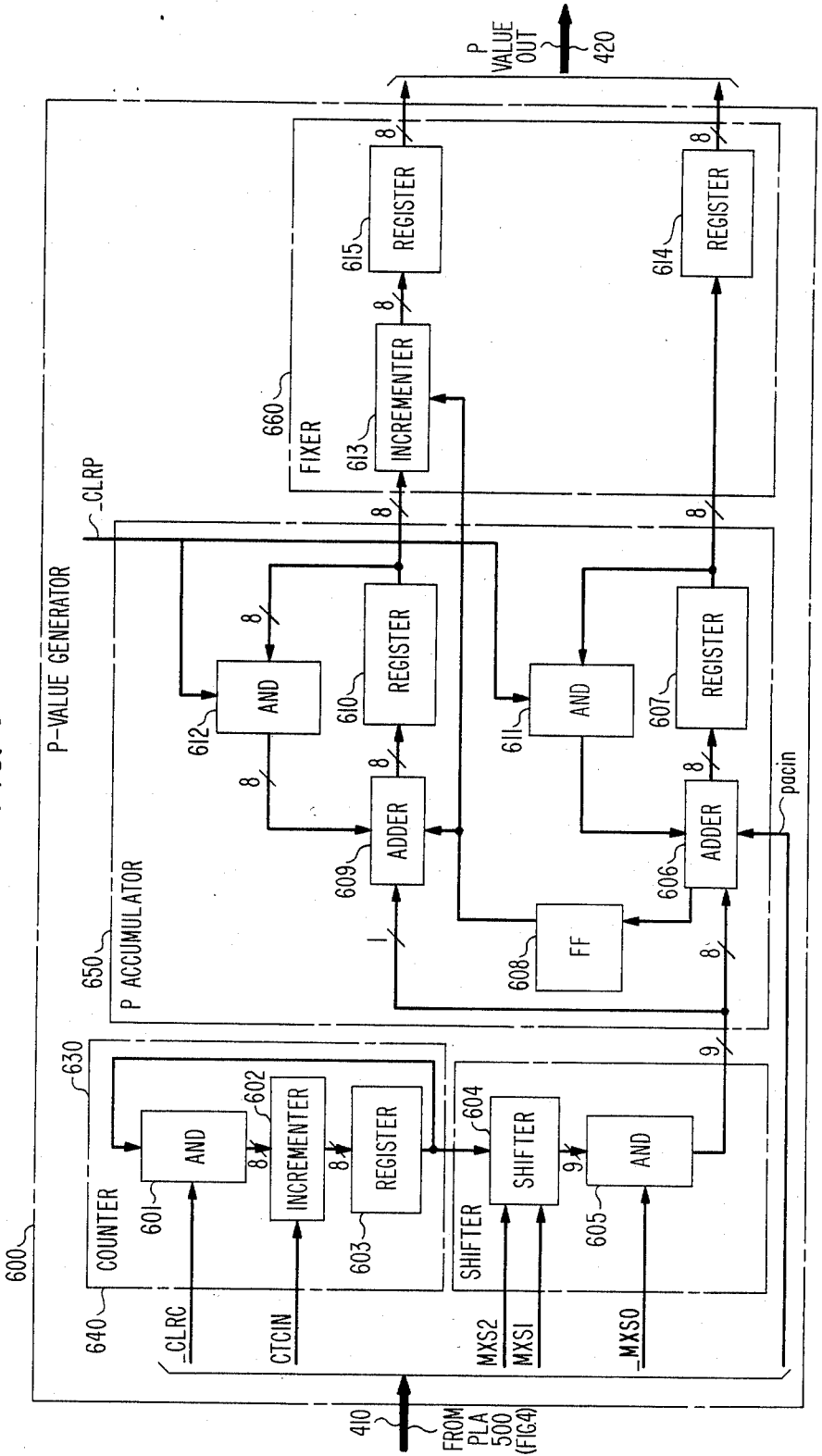
FIG. 6 illustrates a p-value generator 600 including the process of FIG. 3, which generator may be included in the moment generator of FIG. 4.

Referring now to FIG. 6, there is shown a p-value generator 600 which is useful in illustrating some of the principles of my invention. As to the function of p-value generator 600, a detailed description now follows.

Although p-values are regularly being generated by generator 600, it appears desirable, for purposes of description, to interrupt its generating and assume the description begins with counter 630 and wherein at AND gates 601. In any event, p-value generator 600 embodies the priorly described iterative and recursive process shown in FIG. 3. Now turning to FIG. 6, AND gates 601, incrementers 602 and register 603 together comprise a counter 630 which is used to generate the x and y values shown in FIG. 3. A single counter may suffice for both x and y since it may be seen from FIG. 3 that the generation of any specific moment requires either an x counter or a y counter but not both. Signal "_ clrc", which is generated by the PLA 500, is applied to the AND gates 601 to clear the counter 630. Signal "ctcin" is applied to incrementers 602 and is used to increment the values stored in counter 630, which stored value is either the x or y value shown in FIG. 3, and is such that $0 \leq x \leq M(=255)$; $0 \leq y \leq N(=255)$; where x and y are integers. Register 603 is used to store the value of the counter from one clock period to the next clock period i.e. from one PC signal to the next PC signal. Although not shown, the clock signal used in moment generator 400 is, as was priorly described, assumed to have a period of 160 nanoseconds.

The p-value accumulator 650 includes adders 606 and 609; AND gates 611 and 612; flip-flop 608; and registers 607 and 610. Functionally p-value accumulator 650 stores the prior p-value p while the next p-value p' is generated in accord with FIG. 3. The prior p-value, which is stored in registers 607 and 610, the high order bits being stored in register 610 and the low order bits being stored in register 607, it combined through AND gates 611 and 612 with the "_ clrp" signal, which is supplied by PLA 500, to form one input to adders 606 and 609. An output of adders 606 and 609 is applied to form the next p-value to be stored in registers 607 and 610 and hence is the next p-value p'. A second input to adders 606 and 609 comes from shifter 640 and in particular from shift apparatus 604 and AND gate 605, which in turn are controlled by signals mxs2, mxs1 and _ mxs0 also supplied by the PLA 500. Referencing FIG. 3, the shifter 640 may generate either (i) a zero, if signal _ mxs0 is a zero, or (ii) the counter value from counter 630 if the _ mxs0 signal is a logic one and the mxs1 signal is a logic one, or (iii) two times the counter value in register 603 if the _ mxs0 signal is a logic one and the msx1 signal is a logic zero and the mxs2 is a logic one. The preceding description explains the addition, shifting and stuffing operations priorly mentioned. Also, as priorly mentioned, my embodiment does not actually stuff a "1" in those instances where a "1" is added (see FIG. 3) but rather makes use of a carry save adder arrangement responsive to a "pacin" signal being supplied to adder 606. Flip-flop 608 is used to store the output of adder 606 until the next clock period during which it will be applied to both adder 609 and within fixer 660 to incrementer 613. Flip-flop 608 implements the carry save adder technique referred to previously. Incrementer 613 together with registers 614 and 615 comprise a fixer 660 which supplies the p-value output of the p-value generator 600 over cable 420.

Referring to the earlier description with reference to equation (5), the p-values thusly generated are combined with the $a_k$ elements of weight vector $\bar{a}(x,y)$ to form the $F_k$-values. Toward that end, $a_k$ values are extended from preprocessor 800 over cable 160 to an input of a respective one of the $F_k$-value generators 700-k, only one of which is shown in FIG. 7 it being understood that there are n+1 such $F_k$-value generators as shown in FIG. 4.

Figure 7:
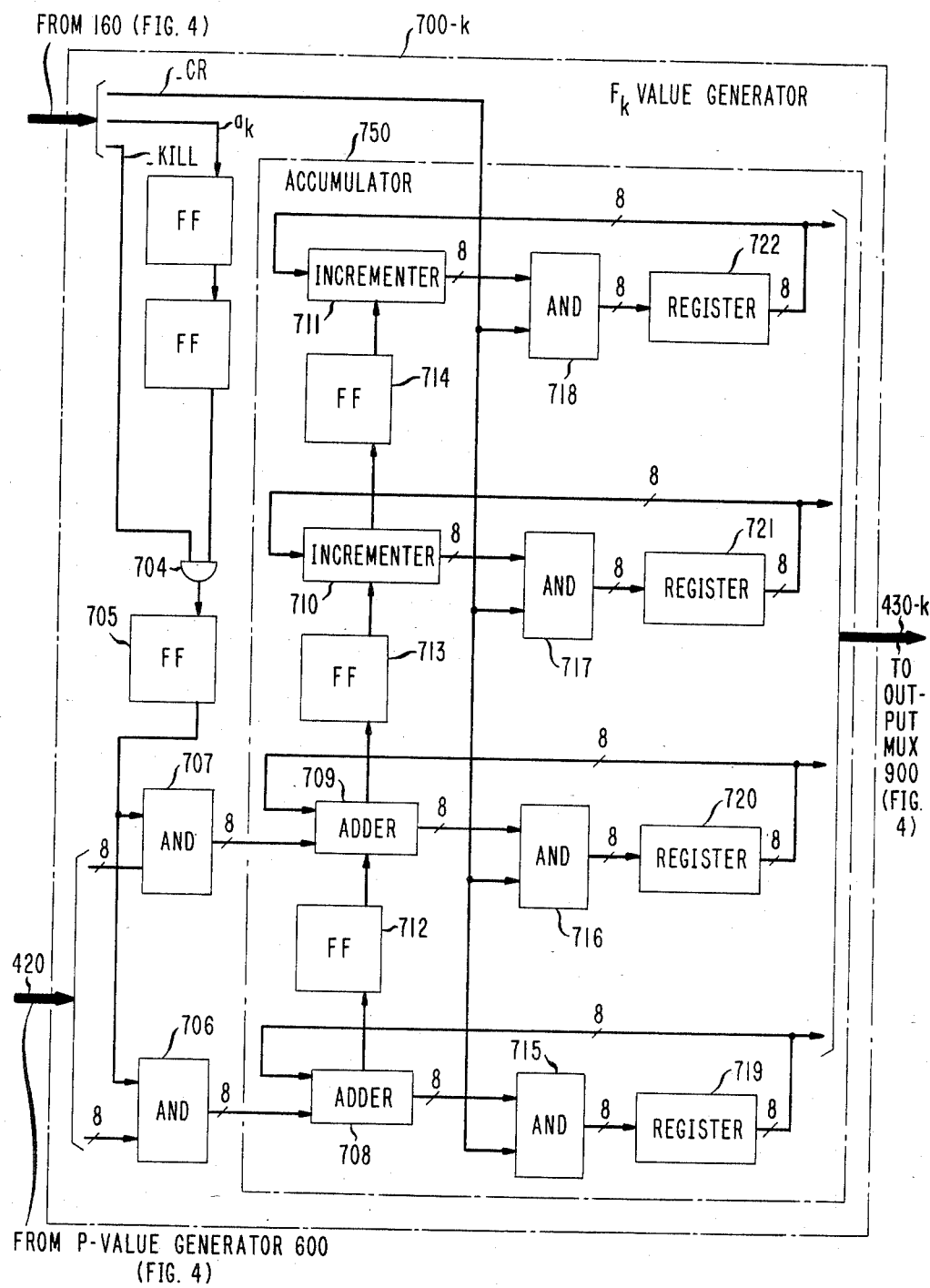
FIG. 7 illustrates one of a plurality of $F_k$-generators 700-k which may be included in the moment generator of FIG. 4.
Figure 9:
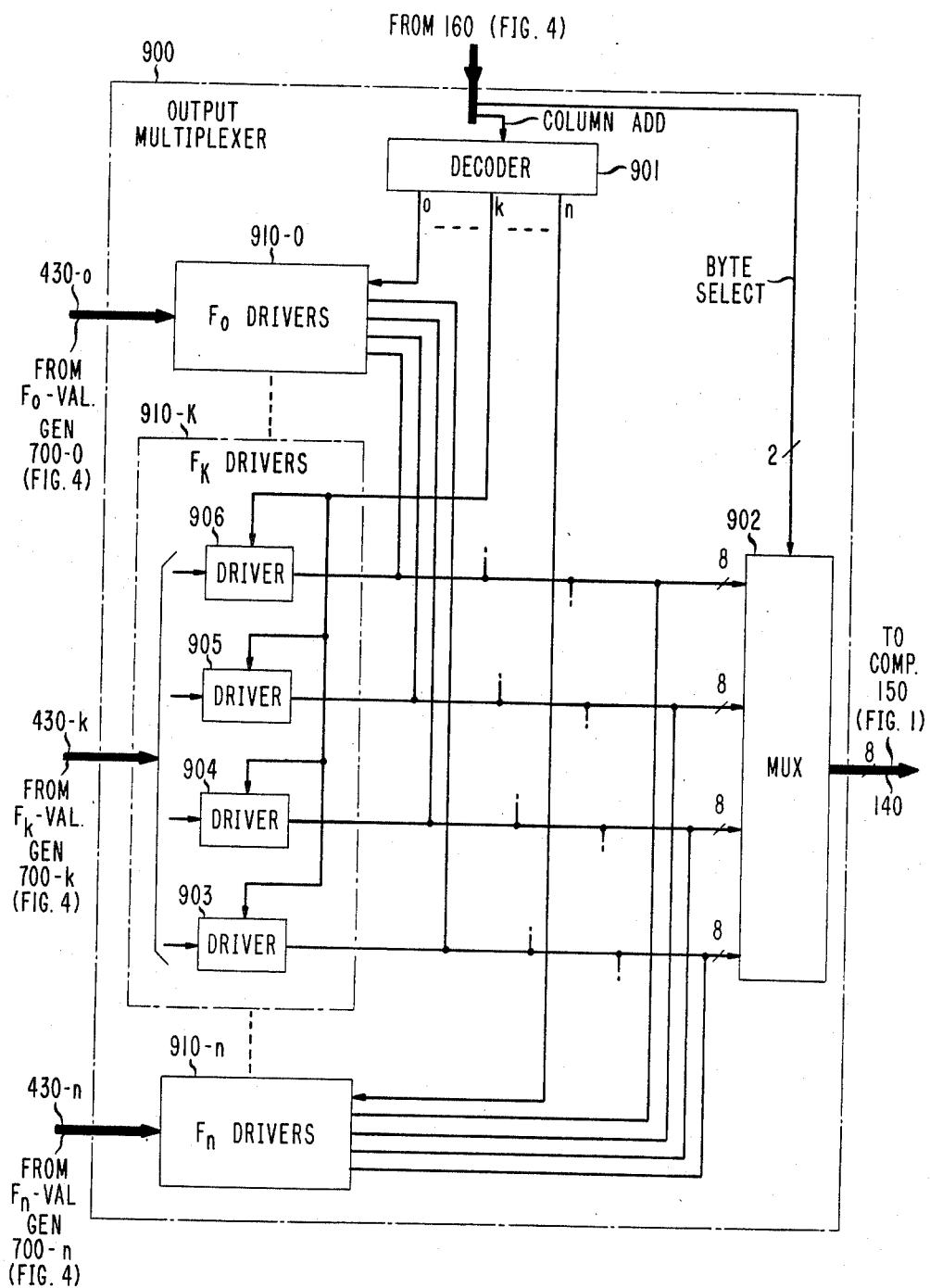
FIG. 9 illustrates an output multiplexer 900, which may be included in the moment generator of FIG. 4.

Turning now to FIG. 7, we follow with a description of illustrative $F_k$-value generator 700-k. First computer 150 may extend a logic zero "_ cr" signal over cable 160 to each of AND gates 715, 716, 717 and 718 in accumulator 750 for clearing accumulator 750, thereby initializing $F_k$-value generator 700-k. Consistent with equation (5), the $a_k$ input to $F_k$-value generator 700-k, which represents the $k^{th}$ bit of the input weight $\bar{a}(x,y)$ from preprocessor 800, is applied over cable 160 through flip-flops 701, 702 and 703, which flip-flops function to equalize the delay between the $a_k$ signal and the p-value signals arriving over cable 420 from the p-value generator 600. An output of flip-flop 703 is logically ANDed via AND gate 704 with the "_ kill" signal from PLA 500 and thereafter supplied as an input to flip-flop 705. The "_ kill" signal is used to suppress moment generation during video blanking. As priorly mentioned, my image processor can avoid the multiplication of equation (5). For example, an output of flip-flop 705 is logically ANDed through AND gates 706 and 707 with the p-value as received from p-value generator 600 over cable 420. Outputs of AND gates 706 and 707 are extended through accumulator 750 wherein the $F_k$-values are accumulated. Consider, for example, one combination of adder 708, AND gate 715 and register 719. The combination functions as an aforementioned carry-save adder. The $F_k$-value generator operates in my illustrative example on 32 bit words. In order to improve the efficiency by reducing propagation delay the carry-save adder function dismembers the 32-bit word into four 8-bit words through the use of the flip-flops such as flip-flops 712, 713 and 714 thereby obtaining the further efficiencies priorly recited. In order to further reduce hardware costs, incrementers 710 and 711, which are less expensive than adders, are there used instead of adders. This can occur because incrementer 710 and 711 need not have direct inputs from p-value generator 600 and hence need not use adders. The $F_k$-values are then extended through AND gates 715, 716, 717 and 718 as a dismembered 32-bit word to registers 719, 720, 721, and 722 wherein the $F_k$-values are accumulated. The respective $F_k$ values are thereafter extended over a respective cable 430-k to output multiplexer 900 and therein to a respective $F_k$ driver 910-k including drivers 803, 904, 905 and 906.

As mentioned, there are n+1 such $F_k$-values so generated. The $F_k$-values may be straightforwardly extended by way of output multiplexer 900 over cable 140 to first computer 150. For example, responsive to enable signals from first computer 150 over cable 160, decoder 901 of a respective moment generator 400 (if a plurality of generators 400 are coupled in parallel) may enable its respective output multiplexer 900, which in turn may sequentially unable its drivers 910-0 through 910-n to extend the respectively accumulated $F_0$ through $F_n$ values to multiplexer 902. More particularly, multiplexer 902 may use open collector type outputs so that, in the event that a plurality of moment generators 400 are coupled in parallel, the respective multiplexer may be enabled or disabled. Multiplexer 902, responsive to an enable signal and to a two-bit byte select signal from computer 150 over cable 160, may extend the 32-bit $F_k$-value in a dismembered byte-by-byte manner over cable 140 to first computer 150. In particular, the $F_0$-value is first extended through multiplexer 900 to computer 150; then the $F_1$-value is extended in that same manner; et cetera. Responsive thereto, the iterative logical binary shifting identified by equation (4) can readily be performed by first computer 150 for completing the generation of moment $M_{i,j}$. Indeed moment $M_{i,j}$ can be generated by a simple shift operation within first computer 150 followed by an addition thereby further increasing the speed at which my image processor generates the respective moments.

Also, as priorly mentioned, moments $$M_{i,j}^{(r)}$$

of two or more regions (r=0,1,2, ... ,t) where t≦n of a picture may be concurrently generated. For example, first computer 150 may be adapted to perform the iterative binary shifting of equation (4) in a subset manner such as for example, for two regions where r=0 and r=1, $$M_{i,j}^{(0)} = \sum_{k=0}^{m} 2^k F_k \text{ and}$$

$$M_{i,j}^{(1)} = \sum_{k=m+1}^{n} 2^{k-(m+1)} F_k,$$

for 0≦m<n, or, such as, for example, for n+1 regions where r=0,1,2, ... ,n, alternatively $$M_{i,j}^{(0)} = F_0; M_{i,j}^{(1)} = F_1; \ldots M_{i,j}^{(n)} = F_n.$$

The moments for other alternative numbers of regions may also be concurrently generated. Thereby a plurality of moments $$M_{i,j}^{(r)}$$

may be concurrently generated.

Although the invention has been described and illustrated in detail, it is to be understood that same is by way of illustration and example only. For brevity, some alternative modifications of the principles of the invention have been disclosed. Still other modifications of the principles of the invention will occur to those skilled in the art. Accordingly, the invention is not to be considered limited by the embodiment(s) shown and thus the spirit and scope of the invention are limited only by the appended claims.

What is claimed is:

1. An image processor adapted to identify source image signals, said image signals being composed of a plurality of picture elements and representing a physical object CHARACTERIZED IN THAT said image processor comprises:

means for extracting synchronization signals from said image signals, said image signals being multi-level weight signals, means responsive to said synchronization signals and said image signals for selectively modifying said image signals, and means for iteratively and recursively generating a moment of a preselected order greater than zero of said selectively modified image signals.

2. The image processor defined in claim 1 wherein said moment generating means further comprises:

means responsive to said synchronization signals and to applied moment select signals for specifying a moment $M_{i,j}$ where the sum of i and j defines the order of the moment and for providing iterative control signals characteristic of said moment $M_{i,j}$, and means responsive to said iterative control signals for iteratively and recursively generating moment computation signals characteristic of said order of the moment, said signals being combined to form said moment of said image signals.

3. The image processor defined in claim 2 wherein each of said picture elements is assigned to a row and a column and said moment generating means further comprises:

means responsive to said iterative control signals for generating p(x,y) signals, where p(x,y) is a value associated with each of said picture elements computed in accordance with a function characteristic of said moment select signals where x is the column of said picture element and y is the row of said picture element, and first means, for combining said p(x,y) signals and said image signals to develop $F_k$ signals, with each $F_k$ signal being the sum of products with each product composed of said signal p(x,y) multiplied by the $k^{th}$ binary coefficient of the associated picture element.

4. The image processor defined in claim 3 wherein said moment generating means further comprises:

second means, responsive to said moment select signals, for combining said $F_k$-signals and providing a moment of said image signals.

5. The image processor defined in claim 1 wherein said moment generating means further comprises:

means for concurrently generating a moment for each of a plurality of regions of a picture represented by said image signals.

6. An image processing system comprising:

means for providing source image signals, means responsive to said source image signals for extracting synchronization signals therefrom, preprocessing means responsive to said synchronization signals and to applied moment select signals for providing iterative control signals, and means responsive to said iterative control signals and to said image signals for iteratively and recursively providing a moment of said image signals.

7. The image processing system defined in claim 6 wherein said moment providing means further comprises:

means for concurrently providing a moment for each of a plurality of regions of a picture represented by said image signals.

8. A method for processing image signals composed of a plurality of picture elements with known positional relationship to a preselected reference point said image signals being provided from an image source and said image signals representing a physical object and CHARACTERIZED IN THAT said method comprises the steps of:

extracting synchronization signals from said image signals, said image signals being weight signals relative to said positional relationship of each of said picture elements, selectively modifying said image signals responsive to said synchronization signals and to said image signals, and iteratively and recursively generating a moment of preselected order greater than zero of said selectively modified image signals.

9. The method for processing image signals defined in claim 8 further comprising the steps of:

providing iterative control signals responsive to said synchronization signals and to applied moment select signals, iteratively and recursively generating values responsive to said iterative control signals, and combining said values to form said moment of said image signals.

10. The method defined in claim 9 further comprising the steps of:

generating p-values for each picture element characteristic of said preselected order of said moment and related to said positional relationship of the picture element from which said p-value derives responsive to said iterative control signals, combining said p-values of said image signals by developing products of said p-values and said image signals, and generating $F_k$-values responsive to said combined p-values and image signals by summing said combined p-values and image signals over all of said picture elements.

11. The method defined in claim 10 further comprising the steps of:

combining said $F_k$-values and providing a moment of said image signals responsive to said combined $F_k$-values and to said moment select signals.

12. The method defined in claim 8 further comprising the step of:

concurrently generating a moment for each of a plurality of regions of a picture represented by said image signals.

13. An image processor adapted to identify source image signals, said image signals being composed of a plurality of picture elements and representing a physical object CHARACTERIZED IN THAT said image processor comprises:

means for extracting synchronization signals from said image signals, said image signals being multi-level weight signals, means responsive to said synchronization signals and said image signals for selectively modifying said image signals, and moment generating means for developing a plurality of moment defining signals associated with each one of said plurality of picture elements, with each of said moment defining signals being generated from the moment defining signal of an adjacent picture element, and combining said moment defining signals with said image signals to develop a moment of said image signals.

14. The moment generator defined in claim 13 wherein said moment generating means further comprises:

means for concurrently generating a moment for each of a plurality of regions of a picture represented by said image signals.

* * * * *

UNITED STATES PATENT AND TRADEMARK OFFICE
CERTIFICATE OF CORRECTION

PATENT NO. : 4,550,432

DATED : October 29, 1985

INVENTOR(S) : Russell L. Andersson

It is certified that error appears in the above-identified patent and that said Letters Patent is hereby corrected as shown below:

Column 8, line 13, "mse12, mse11, and mse10" should read --mse12, mse11, and mse10--; line 41, "RV" should read --TV--. Column 9, line 12, "mse12, mse11," should read --mse12, mse11,--; line 13, "mse10" should read --mse10--. Column 11, line 33, "803" should read --903--.

Signed and Sealed this

Sixteenth Day of September 1986

[SEAL]

Attest:

DONALD J. QUIGG

Attesting Officer

Commissioner of Patents and Trademarks